US010865885B2

(12) United States Patent
Joshi et al.

(10) Patent No.: US 10,865,885 B2
(45) Date of Patent: Dec. 15, 2020

(54) CONTROL VALVE ASSEMBLY

(71) Applicant: FORBES MARSHALL PRIVATE LIMITED, Maharashtra (IN)

(72) Inventors: Milind Joshi, Maharashtra (IN); Prashant Ranade, Maharashtra (IN); Amol Ambhore, Maharashtra (IN)

(73) Assignee: FORBES MARSHALL PRIVATE LIMITED, Maharashtra (IN)

( * ) Notice: Subject to any disclaimer, the term of this patent is extended or adjusted under 35 U.S.C. 154(b) by 0 days.

(21) Appl. No.: 16/084,718

(22) PCT Filed: Feb. 1, 2017

(86) PCT No.: PCT/IB2017/050521
§ 371 (c)(1),
(2) Date: Sep. 13, 2018

(87) PCT Pub. No.: WO2017/158444
PCT Pub. Date: Sep. 21, 2017

(65) Prior Publication Data
US 2019/0078690 A1    Mar. 14, 2019

(30) Foreign Application Priority Data
Mar. 18, 2016  (IN) .............................. 201621009579

(51) Int. Cl.
*F16K 3/24*    (2006.01)
*F16K 25/02*   (2006.01)
(Continued)

(52) U.S. Cl.
CPC .............. *F16K 3/246* (2013.01); *F16K 25/00* (2013.01); *F16K 25/02* (2013.01); *F16K 31/1262* (2013.01)

(58) Field of Classification Search
CPC .......... F16K 25/00; F16K 3/246; F16K 25/02; F16K 31/1262
See application file for complete search history.

(56) References Cited

U.S. PATENT DOCUMENTS 3,304,949 A  *  2/1967  Baumann ............ F16K 31/1262
                                                          137/270
3,794,071 A     2/1974  Scott
                        (Continued)

OTHER PUBLICATIONS

International Search Report issued by the Indian Patent Office acting as the International Searching Authority in relation to International Application No. PCT/IB2017/050521 dated May 4, 2017 (3 pages).
(Continued)

*Primary Examiner* — Kevin R Barss
(74) *Attorney, Agent, or Firm* — Robert P. Michal, Esq.; Carter, DeLuca & Farrell LLP

(57) ABSTRACT

A control valve assembly has a self-aligning construction, better life, durability, and functionality. The control valve assembly includes a valve, an actuator, a yoke, and a positioner. The valve includes a body, a seat, a bonnet, and a plug and stem assembly. The body has at least one first counterbore and at least one second counterbore. The seat is disposed within the body. The bonnet is receivable within the body. The plug and stem assembly is disposed within the bonnet. The at least one first counterbore is configured to facilitate central alignment of the seat with the body. The at least one second counterbore is configured within the body to facilitate the central alignment of the bonnet with the body.

9 Claims, 8 Drawing Sheets

(51) Int. Cl.
*F16K 31/126* (2006.01)
*F16K 25/00* (2006.01)

(56) References Cited

U.S. PATENT DOCUMENTS

| | | | | |
|---|---|---|---|---|
| 4,219,046 | A * | 8/1980 | West | F16K 5/025 137/375 |
| 4,645,176 | A * | 2/1987 | Ogawa | F16K 31/0655 251/129.08 |
| 4,836,243 | A | 6/1989 | Ferrell | |
| 5,706,856 | A * | 1/1998 | Lancaster | F16K 47/08 137/556.3 |
| 7,225,831 | B2 * | 6/2007 | Hope | F16K 15/025 137/516.27 |
| 7,721,753 | B2 * | 5/2010 | Wears | F16K 1/48 137/315.27 |
| 9,359,999 | B2 * | 6/2016 | Ohligschlaeger | F04B 17/042 |
| 9,920,842 | B1 * | 3/2018 | Karani | F16K 3/314 |
| 2011/0155250 | A1 * | 6/2011 | Nannan | F15B 9/03 137/1 |
| 2012/0001103 | A1 * | 1/2012 | Kiesbauer | F16K 1/48 251/12 |
| 2012/0269925 | A1 * | 10/2012 | Farotto | C12G 1/00 426/15 |
| 2015/0233489 | A1 * | 8/2015 | Gossett | F16K 31/126 251/63.6 |
| 2018/0090235 | A1 * | 3/2018 | Ko | F16K 1/00 |

OTHER PUBLICATIONS

Written Opinion of the International Searching Authority issued by the Indian Patent Office acting as the International Searching Authority in relation to International Application No. PCT/IB2017/050521 dated May 4, 2017 (4 pages).

* cited by examiner

CONTROL VALVE ASSEMBLY

CROSS-REFERENCE TO RELATED APPLICATIONS

This application is a National Phase Entry under 35 U.S.C. 371 of PCT International Application No. PCT/IB2017/050521 filed Feb. 1, 2017, which claims priority to Indian Patent Application No. 201621009579, filed Mar. 18, 2016, the disclosure of each of these applications is expressly incorporated herein by reference in their entirety.

FIELD

The present disclosure relates to the field of mechanical engineering. Particularly, the present disclosure relates to the field of control systems.

Definitions

As used in the present disclosure, the following terms are generally intended to have the meaning as set forth below, except to the extent that the context in which they are used indicate otherwise.

Counterbore: The term "Counterbore" hereinafter in the complete specification refers to a groove or a hole having a wider cross-section at one end.

This definition is in addition to those expressed in the art.

BACKGROUND

Typically, process plants consist of a plurality of conventional control valves that are configured to control flow, temperature, and pressure. The conventional control valves typically face difficulties in alignment of an actuator, a positioner, and a valve with each other which affects the performance of the control valve. The misalignment in concentricity of an actuator stem, a positioner fitment, and a valve stem affects the performance of the control valve. The displacement or the rotation of the positioner with respect to a yoke impacts the hysteresis and linearity accuracies in the control valve. Hence, recalibration or reassembly of the whole control valve is required. The misalignment between a plug and a seat creates a gap therebetween that increases the leakage of fluid therethrough. The conventional control valve has a weaker joint between the plug and the stem which leads to failure of the valve. Further, the weaker joint between the plug and the stem may lead to detachment, misalignment or rotation between the plug and the stem which is undesirable. Many processes, in which the control valve is used, are subjected to high vibrations. The conventional control valves are unable to withstand such vibrations and often fail during operation.

Hence, there is felt a need of a control valve that alleviates above mentioned drawbacks.

OBJECTS

Some of the objects of the present disclosure, which at least one embodiment herein satisfies, are as follows:

An object of the present disclosure is to provide a control valve assembly that has a self-aligning construction.

An object of the present disclosure is to provide a control valve assembly that has a stronger joint between a plug and a stem.

Another object of the present disclosure is to provide a control valve assembly that allows lesser leakage between a plug and a seat.

Yet another object of the present disclosure is to provide a control valve assembly that has better life, durability, and functionality.

Other objects and advantages of the present disclosure will be more apparent from the following description, which is not intended to limit the scope of the present disclosure.

SUMMARY

The present disclosure envisages a control valve assembly. The control valve assembly comprises a valve, an actuator, a yoke, and a positioner. The valve includes a body, a seat, a bonnet, and a plug and stem assembly. The body has at least one first counterbore and at least one second counterbore. The seat is disposed within the body. The bonnet is receivable within the body. The plug and stem assembly is disposed within the bonnet.

The actuator is coupled with the valve, and is configured to receive the plug and stem assembly therewithin. The yoke is disposed between the actuator and the valve. The yoke is configured to facilitate the alignment between the actuator and the valve. The positioner is disposed between the actuator and the valve. The positioner is connected to the yoke via a bracket, and is configured to facilitate alignment of the actuator stem with the plug and stem assembly.

The at least one first counterbore is configured to facilitate central alignment of the seat with the body. The at least one second counterbore is configured within the body to facilitate the central alignment of the bonnet with the body. The control valve assembly further includes a plurality of slots. The plurality of slots is configured on the bracket for receiving a plurality of bolts. The plurality of bolts is configured to restrict the rotational movement of the positioner with respect to the yoke. Further, a plurality of holes is configured on the yoke. The plurality of holes is configured to receive a plurality of fasteners to restrict the rotational movement of the actuator with respect to the yoke. In an embodiment, the plurality of fasteners is selected from a groups consisting of grub screws, dowel pins, and nut and bolt assembly.

The yoke is hollow and defined by an operative top opening and an operative bottom opening. The operative top opening and the operative bottom opening are connected by a passage defining a bore having a step configuration at the said operative top opening. In one embodiment, the operative top opening has a large cross-section and the operative bottom opening has a small cross-section.

In another embodiment, a spigot is configured at an operative top portion of the bonnet. The spigot is connected to the operative bottom opening of the yoke.

In yet another embodiment, the actuator includes a bottom housing having a sliding bearing. The sliding bearing facilitates alignment of the actuator stem with the plug and stem assembly.

In one embodiment, a third groove is configured within the seat. The third groove provides flexibility between the seat and the plug and stem assembly, thereby enhancing the shut-off characteristics of the valve.

In an embodiment, the plug and stem assembly is formed by joining or welding a plug and a stem together, thereby preventing rotation between the plug and the stem.

In yet another embodiment, the plug and stem assembly has a unibody configuration.

BRIEF DESCRIPTION OF ACCOMPANYING DRAWING

The control valve assembly of the present disclosure will now be described with the help of the accompanying drawing, in which.

LIST OF REFERENCE NUMERALS

1000—Control valve assembly
100—Valve
200—Actuator
201—Seat
202—Body
203—Bonnet
204—Plug and Stem assembly
205—Spigot
206—Third Groove
207—Welded joint
208—At least one first counterbore
209—At least one second counterbore
300—Positioner
301—Yoke
302—Bracket
303—Plurality of bolts
304—Plurality of slots
306—Bottom opening
307—Top opening
402—Plurality of fasteners
403—Sliding bearing
404—Bottom housing
405—Piston
406—Nut
407—Plurality of holes
408—Actuator stem

DETAILED DESCRIPTION

The present disclosure envisages a control valve assembly that has a self-aligning construction and allows minimum leakage.

The control valve assembly of the present disclosure is now described with reference to FIG. 1 through FIG. 4a.

Figure 1:
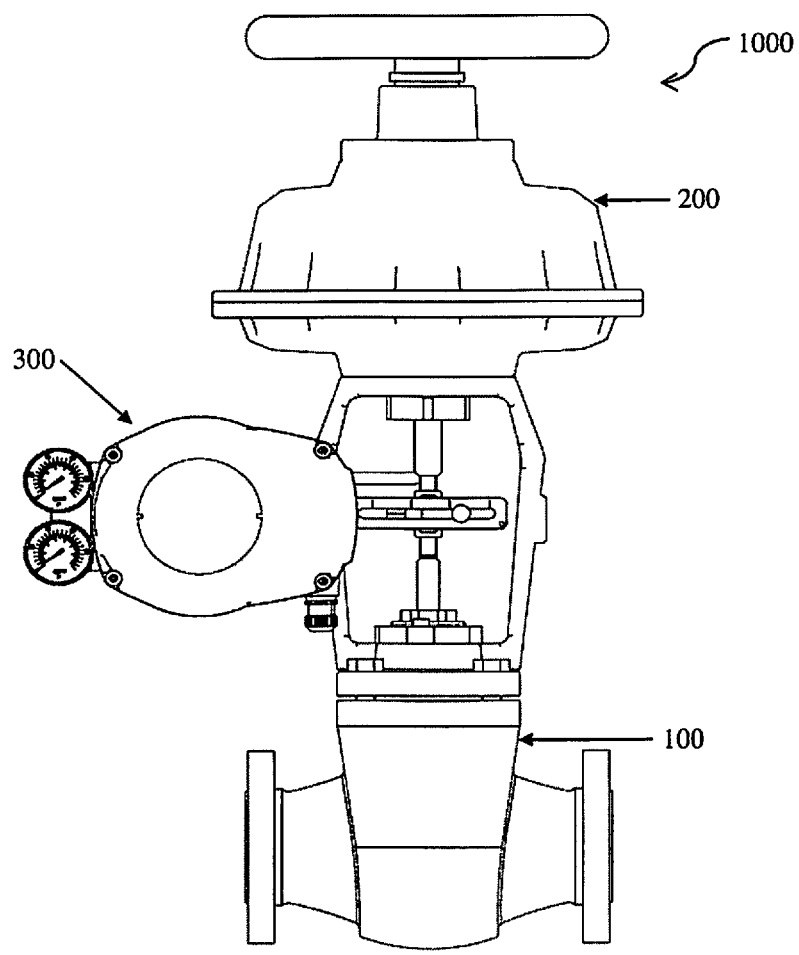
FIG. 1 illustrates a front view of a control valve assembly.
Figure 2:
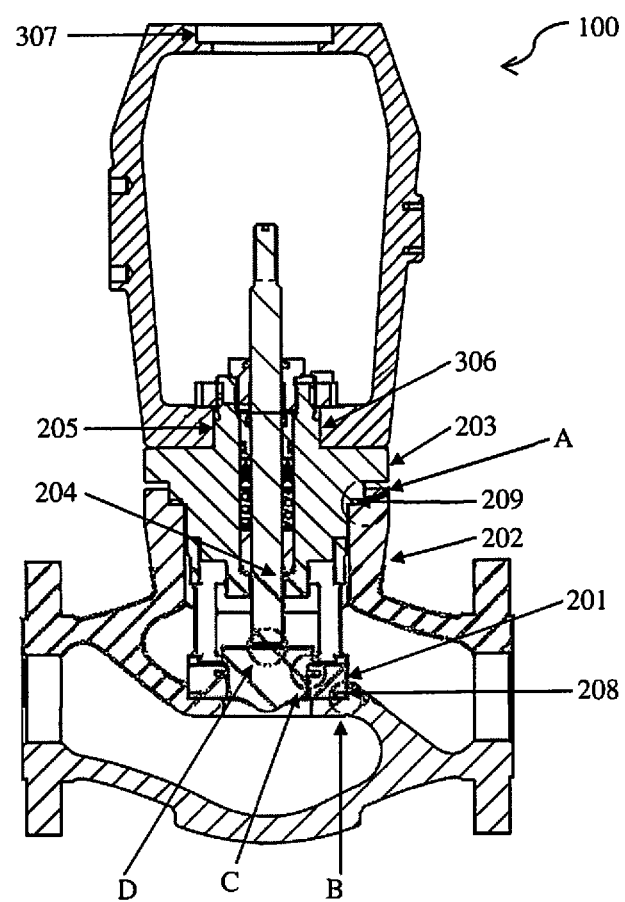
FIG. 2 illustrates a cross sectional view of a valve of the control valve assembly.
Figure 2A:
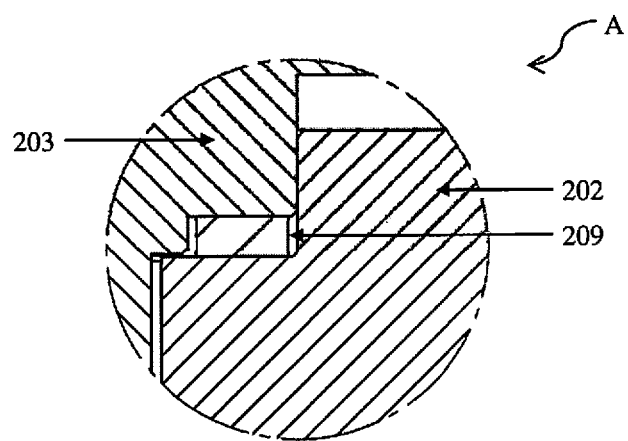
FIG. 2a illustrates a magnified view of section 'A' of the valve of FIG. 2.
Figure 2B:
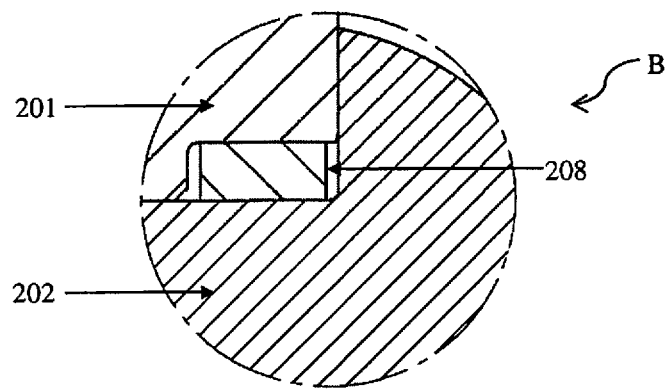
FIG. 2b illustrates a magnified view of section 'B' of the valve of FIG. 2.
Figure 2C:
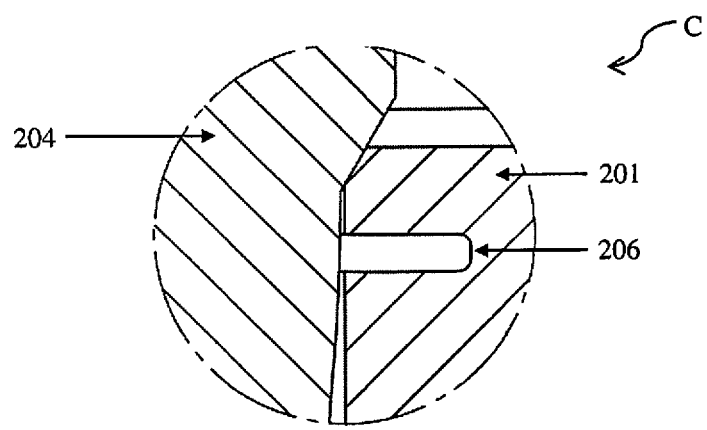
FIG. 2c illustrates a magnified view of section 'C' of the valve of FIG. 2.
Figure 2D:
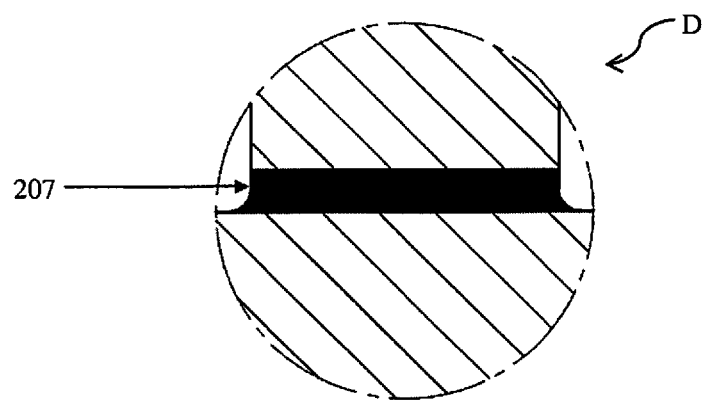
FIG. 2d illustrates a magnified view of section 'D' of the valve of FIG. 2.
Figure 3:
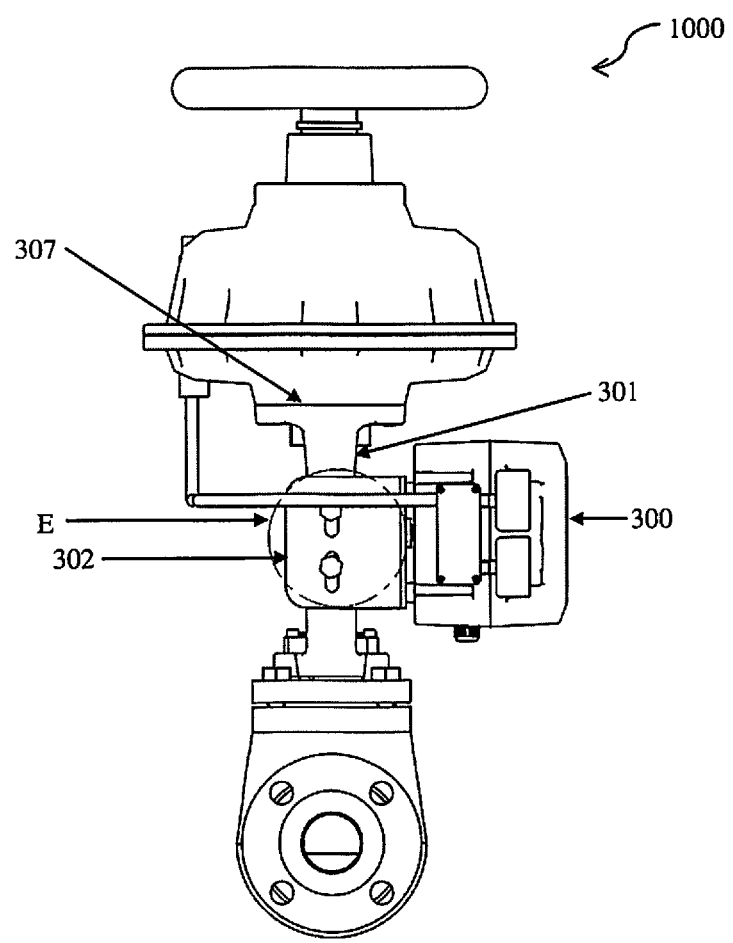
FIG. 3 illustrates a side view of the control valve assembly of FIG. 1.
Figure 3A:
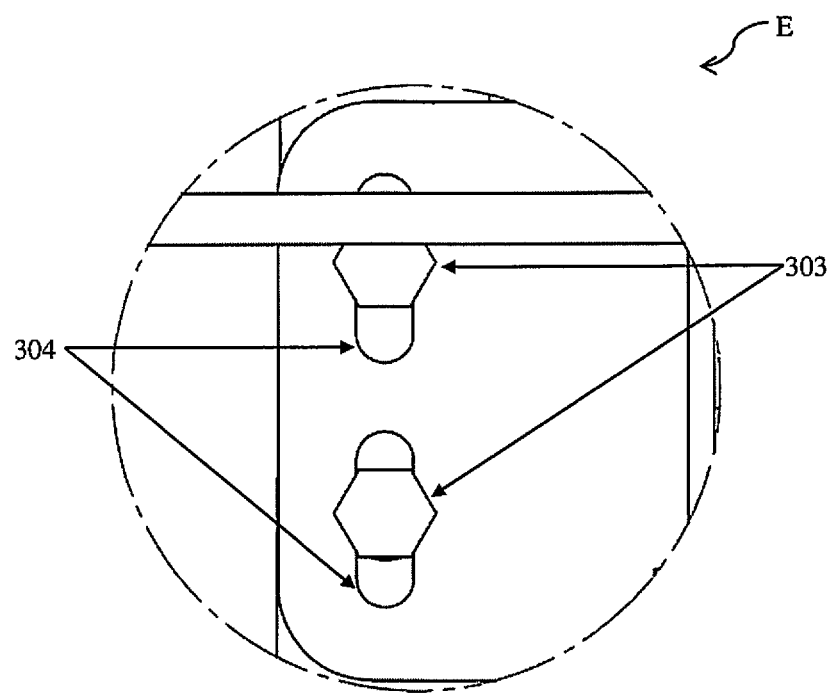
FIG. 3a illustrates a magnified view of section 'E' of the control valve assembly of FIG. 3.
Figure 4:
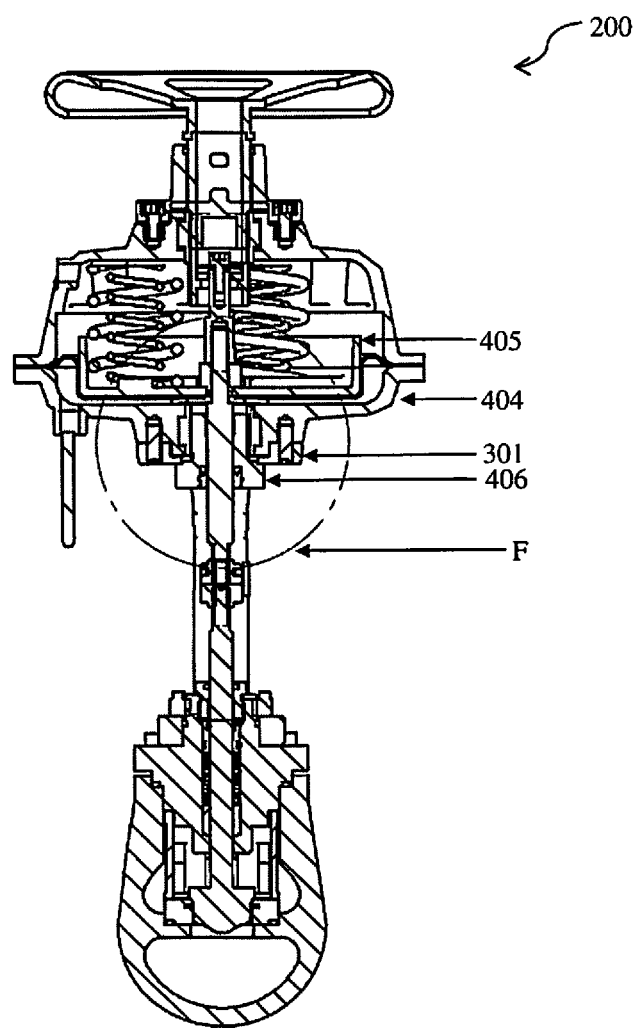
FIG. 4 illustrates a cross sectional view of an actuator of the control valve assembly of FIG. 1.
Figure 4A:
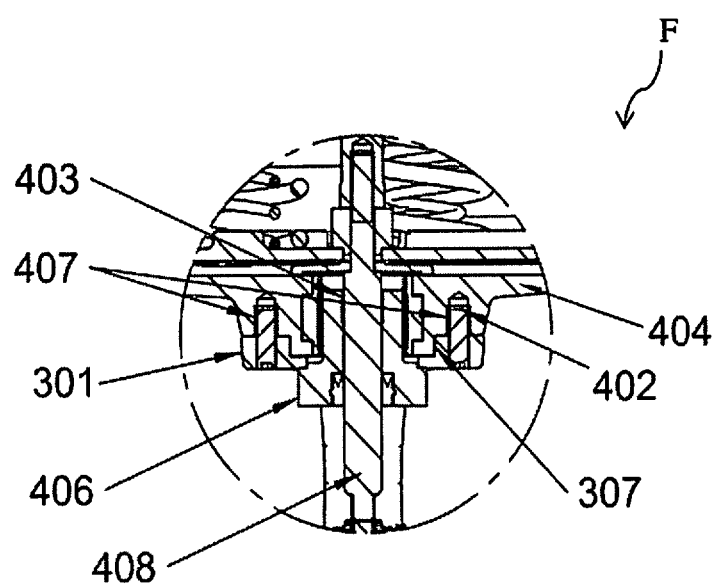
FIG. 4a illustrates a magnified view of section 'F' of the actuator FIG. 4.

FIG. 1 illustrates a front view of a control valve assembly 1000, in accordance with an embodiment of the present disclosure. FIG. 2 illustrates a cross sectional view of a valve 100 of the control valve assembly, in accordance with an embodiment of the present disclosure. FIG. 2a illustrates a magnified view of section 'A' of the valve 100 of FIG. 2. FIG. 2b illustrates a magnified view of section 'B' of the valve 100 of FIG. 2. FIG. 2c illustrates a magnified view of section 'C' of the valve 100 of FIG. 2. FIG. 2d illustrates a magnified view of section 'D' of the valve 100 of FIG. 2. FIG. 3 illustrates a side view of the control valve assembly 1000 of FIG. 1. FIG. 3a illustrates a magnified view of section 'E' of the control valve assembly 1000 of FIG. 3. FIG. 4 illustrates a cross sectional view of an actuator 200 of the control valve assembly of FIG. 1. FIG. 4a illustrates a magnified view of section 'F' of the actuator 200 of FIG. 4.

The control valve assembly 1000 comprises the valve 100, the actuator 200, and a positioner 300.

The valve 100 comprises a seat 201, a body 202, a bonnet 203, and a plug and stem assembly 204. The body 202 is configured to support the seat 201. The seat 201 is disposed within the body 202 such that the seat 201 and the body 202 are centrally aligned. The body 202 has at least one first counterbore 208 and at least one second counterbore 209. The at least one first counterbore 208 is configured within the body 202 and is configured to facilitate the central alignment of the seat 201 with the body 202.

A third groove 206 (as shown in FIG. 2c) is configured within the seat 201 to enhance the shut off characteristics of the valve 100. The third groove 206 facilitates a spring action or flexibility which maintains minimum clearance between the seat 201 and the plug and stem assembly 204, thereby enhancing the shut off characteristics of the valve 100. The plug and stem assembly 204 is disposed within the bonnet 203. In an embodiment, a plug and a stem are welded together to form the plug and stem assembly 204 (as shown in FIG. 2d). In another embodiment, a plug and a stem are joined together to form the plug and stem assembly 204. In still another embodiment, the plug and stem assembly 204 has a unibody configuration.

A permanent joint, that is, a welded joint 207 between the plug and the stem, is formed to eliminate the possibility of rotational motion between the stem and the plug. Further, the welded joint 207 between the stem and the plug also facilitates the absorption of vibration by the plug and stem assembly 204, thereby improving durability and the life of the control valve assembly 1000.

The bonnet 203 is configured to be received within the body 202 such that the bonnet 203 and the body 202 are centrally aligned to each other. The at least one second counterbore 209 is configured within the body 202 to facilitate the central alignment of the bonnet 203 with the body 202.

A yoke 301 is hollow and is defined by an operative top opening 307 and an operative bottom opening 306. The yoke 301 is disposed between the actuator and the valve. The yoke 301 is configured to facilitate the coupling between the actuator and the valve 100. The operative top opening 307 and the operative bottom opening 306 of the yoke 301 is connected by means of a passage defining a bore having a step configuration.

A spigot 205 is configured at an operative top portion of the bonnet 203 and is connected to the operative bottom opening of the yoke 301. The spigot 205 facilitates the connection of the valve 100 with the actuator 200. The spigot 205 is guided in the operative bottom opening 306 of the yoke 301. The operative bottom opening 306 is connected to the spigot 205 of the bonnet 203.

The actuator 200 includes an actuator stem 408 that extends outwardly from the actuator 200. The actuator 200 is configured to receive the plug and stem assembly 204 therewithin. The actuator 200 is connected to the valve 100 via the yoke 301. The actuator further comprises a bottom housing 404, and a piston 405. A sliding bearing 403 is configured on the nut 406 to facilitate alignment of actuator stem 408 with plug and stem assembly 204. The bottom housing 404 of the actuator 200 is tightly guided in a groove configured on the operative top opening 307 of the yoke 301. In an embodiment, the operative top opening 307 of the yoke 301 is connected to the bottom housing 404 of the actuator 200.

A nut 406 is used to connect the bottom housing 404 to the operative top opening 307 of the yoke 301. A plurality of fasteners 402 is configured to restrict the rotational movement of the actuator 200 with respect to the yoke 301. In an embodiment, the plurality of fasteners 402 is selected from a group consisting of grub screws, dowel pins, and nut and bolt assembly. The outside diameter of the plurality of fasteners 402 is guided into a plurality of holes 407 in the yoke and are tightened into a tapping or threading provided in the bottom housing 404, thereby maintaining the non-rotational contact therebetween.

The positioner 300 is disposed between the actuator 200 and the valve 100, and is connected to the yoke 301 via a bracket 302. The positioner 300 is configured to facilitate alignment of the actuator stem 408 with the plug and stem assembly 204. A plurality of slots 304 is configured on the bracket 302 for receiving a plurality of bolts. The positioner 300 is directly connected to the yoke 301 using a plurality of bolts 303 (as shown in FIG. 3a). The plurality of bolts 303 is configured to restrict the rotational motion of the positioner 300 with respect to the yoke 301.

The concentric configuration, that is step configuration, of the operative top opening 307 and operative bottom opening 306 of the yoke 301 ensures concentric alignment between the actuator 200 and the plug and stem assembly 204 (as shown in FIG. 4). This arrangement ensures better feedback loop control. The better feedback loop control ensures optimum hysteresis, linearity, repeatability and sensitivity of the control valve assembly 1000.

The control valve assembly 1000 of the present disclosure is robust in nature.

Technical Advances and Economical Significance

The present disclosure described herein above has several technical advantages including, but not limited to, the realization of a control valve assembly that:

has a self-aligning construction;
has a stronger joint between a plug and a stem thereof;
allows lesser leakage between a plug and a seat thereof; and
has better life, durability, reliability, and functionality.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A control valve assembly comprising:
a valve having:
a body having at least one first counterbore and at least one second counterbore;
a seat disposed within said body;
a bonnet receivable within said body; and
a plug and stem assembly disposed within said bonnet;
an actuator having an actuator stem extending outwardly from said actuator, said actuator coupled with said valve and configured to receive said plug and stem assembly therewithin;

a yoke disposed between said actuator and said valve, and configured to facilitate alignment between said actuator and said valve; and a positioner disposed between said actuator and said valve, and connected to said yoke via a bracket, said positioner configured to facilitate alignment of said actuator stem with said plug and stem assembly;

wherein:
said at least one first counterbore is configured to facilitate alignment of said seat with said body;

said at least one second counterbore is configured to facilitate alignment of said bonnet with respect to said body;

a plurality of slots is configured on said bracket for receiving a plurality of bolts, said plurality of bolts being configured to restrict the rotational movement of said positioner with respect to said yoke; and a plurality of holes is configured on said yoke for receiving a plurality of fasteners to restrict the rotational movement of said actuator with respect to said yoke.

2. The assembly as claimed in claim 1, wherein said fasteners is selected from a group consisting of grub screws, dowel pins, and nut and bolt assembly.

3. The assembly as claimed in claim 1, wherein said yoke is hollow and defined by an operative top opening and an operative bottom opening, said operative top opening and said operative bottom opening connected by a passage defining a bore having a step configuration at said operative top opening.

4. The claim as claimed in claim 3, wherein said operative top opening has a large cross-section and said operative bottom opening has a small cross-section.

5. The assembly as claimed in claim 1, wherein a spigot is configured at an operative top portion of said bonnet, and is connected to said operative bottom opening of said yoke.

6. The assembly as claimed in claim 1, wherein said actuator includes a bottom housing having a sliding bearing to facilitate alignment of said actuator stem with said plug and stem assembly.

7. The assembly as claimed in claim 1, wherein a third groove is configured within said seat to provide flexibility between said seat and said plug and stem assembly.

8. The assembly as claimed in claim 1, wherein said plug and stem assembly is formed by joining or welding a plug and a stem together.

9. The assembly as claimed in claim 1, wherein said plug and stem assembly has a unibody configuration.

* * * * *